US006286050B1

(12) United States Patent
Pullen et al.

(10) Patent No.: US 6,286,050 B1
(45) Date of Patent: *Sep. 4, 2001

(54) SYSTEM AND METHOD FOR MONITORING AND MANAGEMENT OF TELECOMMUNICATIONS EQUIPMENT USING ENHANCED INTERNET ACCESS

(75) Inventors: Steve M. Pullen, Rowlett; Donald W. Miller; Carla M. Atkinson, both of Plano; Eddie E. Bishop, Jr., McKinney; Joe K. Horvath; Alfred J. Blanchard, both of Plano; Ronald H. Gates, Dallas, all of TX (US)

(73) Assignee: Alcatel USA Sourcing, L.P., Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,827

(22) Filed: Sep. 30, 1997

Related U.S. Application Data
(60) Provisional application No. 60/034,874, filed on Jan. 27, 1997.

(51) Int. Cl.[7] .................................................. G06F 15/16
(52) U.S. Cl. ........................ 709/229; 709/203; 709/219; 709/223; 709/224
(58) Field of Search ..................... 395/200.59, 200.54, 395/200.55, 200.49, 200.33, 200.32; 709/223, 224, 229, 219, 203

(56) References Cited

U.S. PATENT DOCUMENTS

| 5,241,588 | * | 8/1993 | Babson, III et al. ................ 379/201 |
| 5,488,569 | * | 1/1996 | Kaplan et al. ....................... 709/228 |
| 5,495,484 | | 2/1996 | Self et al. .......................... 370/110.1 |
| 5,721,908 | * | 2/1998 | Lagarde et al. ..................... 395/610 |

FOREIGN PATENT DOCUMENTS

| 0592080 | 4/1994 | (EP) | ................. G06F/9/46 |
| 0592091 | 4/1994 | (EP) | ................. G06F/9/46 |
| 0602824 | 6/1994 | (EP) | ................. H04L/29/06 |
| 0737922 | 10/1996 | (EP) | ................. G06F/9/46 |
| 9511560 | 4/1995 | (WO) | ................. H04L/29/06 |

OTHER PUBLICATIONS

A.K. Larsen, "Weaving the Management Web", Data Communications, vol. 25, No. 1, Jan. 1, 1996, pp. 92, 94.
K. Hatonen, et al., "TASA: Telecommunication Alarm Sequence Analyzer", IEEE, Apr. 15, 1996, pp. 520–529.
M.A. Hamilton, "Java and the Shift to Net–Centric Computing", Computer, vol. 29, No. 8, Aug. 1996, pp. 31–39.
A.K. Larsen, "The Next Web Wave: Network Management", Data Communications, vol. 25, No. 1, Jan. 1, 1996, pp. 31–32, 34.

(List continued on next page.)

Primary Examiner—Saleh Najjar
(74) Attorney, Agent, or Firm—Baker Botts L.L.P.

(57) ABSTRACT

A system (20) for monitoring and management of telecommunications equipment (10, 30) in a telecommunications network via the internet (34) is provided. The system (20) includes a plurality of user devices (36, 46, 50) each executing a web browser (64) for communications with the internet (34). An intranet (32) is in communications with the internet (34). A web server (84) identifiable by an internet address resides on each telecommunications equipment (10, 30), where the telecommunications equipment of the telecommunications network are coupled to the intranet (32). A plurality of web pages (90) for displaying monitoring and management information associated with the telecommunications equipment are accessible by the web server (84) via the internet (34) and intranet (32).

27 Claims, 9 Drawing Sheets

U.S. PATENT DOCUMENTS

| | | | |
|---|---|---|---|
| 5,742,762 | | 4/1998 | Scholl et al. ......................... 709/200 |
| 5,794,018 | | 8/1998 | Vrvilo et al. ......................... 395/551 |
| 5,802,146 | * | 9/1998 | Dulman ................................. 379/34 |
| 5,826,029 | * | 10/1998 | Gore et al. ...................... 395/200.57 |
| 5,826,030 | | 10/1998 | Hebert ............................ 395/200.58 |
| 5,913,061 | | 6/1999 | Gupta et al. ......................... 395/680 |
| 5,915,008 | * | 6/1999 | Dulman ................................. 379/201 |
| 5,958,016 | * | 9/1999 | Chang et al. ........................ 709/229 |

OTHER PUBLICATIONS

L. Bruno, "Lasting Legacy: Browsing Big Iron on the Web", Data Communications, vol. 25, No. 15, Nov. 1996, pp. 110–112, 116–118, 120.

E. Pennino, "A Vision for an Automatic Message Accounting (AMA) Data Networking System", Proceedings of the Network Operations and Managment Symposium (NOMS), vol. 1, 6–9, Apr. 1992, pp. 196–207.

PCT Search Report, dated Aug. 24, 1999.

* cited by examiner

SYSTEM AND METHOD FOR MONITORING AND MANAGEMENT OF TELECOMMUNICATIONS EQUIPMENT USING ENHANCED INTERNET ACCESS

RELATED PATENT APPLICATIONS

This application claims the benefit of provisional patent application Ser. No. 60/034,874, titled Apparatus and Method for Monitoring and Management of Telecommunications Equipment Using Enhanced Internet is Access, filed on Jan. 27, 1997.

TECHNICAL FIELD OF THE INVENTION

This invention is related in general to the field of telecommunications. More particularly, the invention is related to a system and method for monitoring and management of telecommunications equipment using enhanced internet access.

BACKGROUND OF THE INVENTION

A telecommunications service provider such as MCI typically owns and operates a large number of telecommunications switches and other equipment in the public switched telephone network. These telecommunications switches are generally physically located throughout the United States and the globe to achieve close proximity access to the telephone customers.

Within the telecommunications service provider there may be a central network operations site that has access to all the telecommunications equipment in the network owned by the service provider to perform support, monitoring and management services. These services include billing, and setting up or changing telephone services. The telecommunications equipment are further monitored and controlled by additional craft personnel who operate out of offices that are physically located closer to the equipment they manage. Other craft personnel may operate out of more remote sites such as their home offices. Typically, a modem-based RS232 ASCII protocol is used for the link up between X-terminals located at the remote sites to the telecommunications equipment. Although graphical user interfaces (GUIs) can be supported by this access scheme, it is excruciating slow because it operates on a bit map or pixel information basis. Thus, a very wide pipe, such as a T1 span, is required to enable even minimally adequate graphical update of screen information and display.

There is a further need to allow the telecommunications equipment manufacturer to have access to the telecommunications equipment for further product support. Generally, the customer support, field service personnel, and engineers do not have access to most or all of the telecommunications equipment operating in the field. This is highly desirable to provide the telecommunications service provider, and, ultimately, the telecommunications customers, the best and responsive maintenance and support possible.

SUMMARY OF THE INVENTION

Accordingly, there is a need to provide enhanced access to telecommunications equipment in the telecommunications network for monitoring and management thereof.

In accordance with the present invention, system and method for monitoring and management of telecommunications equipment using enhanced internet access are provided which eliminate or substantially reduce the disadvantages associated with prior systems and methods.

In one aspect of the invention, a system for monitoring and management of telecommunications equipment using the internet is provided. The system includes a web server residing on the telecommunications equipment, where the web server is identifiable by an internet address. A plurality of web pages containing monitor information associated with the telecommunications equipment are accessible by the web server by specifying an internet address therefor. A web browser application executing on a user device may be connected with the web server using its internet address and to further receive the plurality of web pages therefrom over the internet. The web pages further receive user input and transmit them to the web server.

In another aspect of the invention, a system for monitoring and management of telecommunications equipment in a telecommunications network via the internet is provided. The system includes a plurality of user devices each executing a web browser for communications with the internet. An intranet is in communications with the internet. A web server identifiable by an internet address resides on each telecommunications equipment, where the telecommunications equipment of the telecommunications network are coupled to the intranet. A plurality of web pages for displaying monitoring and management information associated with the telecommunications equipment are accessible by the web server via the internet and intranet.

In yet another aspect of the invention, a method for monitoring and management of telecommunications equipment in a telecommunications network via the internet is provided. The method includes the steps of connecting a plurality of user devices to the internet, each user device executing a web browser, and connecting the telecommunications equipment by an intranet to the internet. The telecommunications equipment may be accessed by specifying an internet address of a web server residing on the telecommunications equipment, and downloading a plurality of web pages from the web server via the internet and intranet. The web pages display monitor and management information associated with the telecommunications equipment.

BRIEF DESCRIPTION OF THE DRAWINGS

For a better understanding of the present invention, reference may be made to the accompanying drawings, in which.

DETAILED DESCRIPTION OF THE INVENTION

The preferred embodiment(s) of the present invention is (are) illustrated in FIGS. 1–11, like reference numerals being used to refer to like and corresponding parts of the various drawings.

Figure 1:
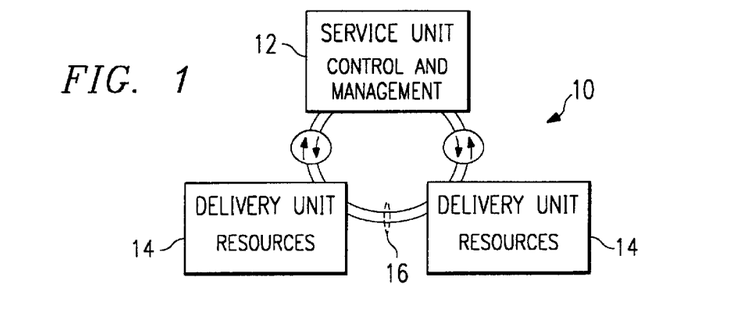
FIG. 1 is a high level block diagram of a distributed telecommunication switching system.

Referring to FIG. 1, a distributed telecommunications switching system 10 is shown. Distributed telecommunications switching system 10 includes a service unit 12 that preferably provides control and management on an advanced intelligent network (AIN) service platform using information network architecture (INA) software design principles. Distributed telecommunications switching system 10 further includes at least one delivery unit 14 that provides the message transport mechanism for call information under the control and direction of service unit 12. Service unit 12 and delivery units 14 may communicate with one another through a fiber optic or wire-based ring 16. Call information is preferably transported between delivery units 14 and service unit 12 in asynchronous transfer mode (ATM) cell format. Delivery units 14 may operate in a broadband, wideband, narrowband, or a combination of these speeds and formats. For a more detailed description of distributed telecommunications switching system 10, please refer to U.S. Pat. No. 5,495,484, titled Distributed Telecommunications Switching System, issued to Self et al. on Feb. 27, 1996, which is incorporated herein by reference.

Figure 2:
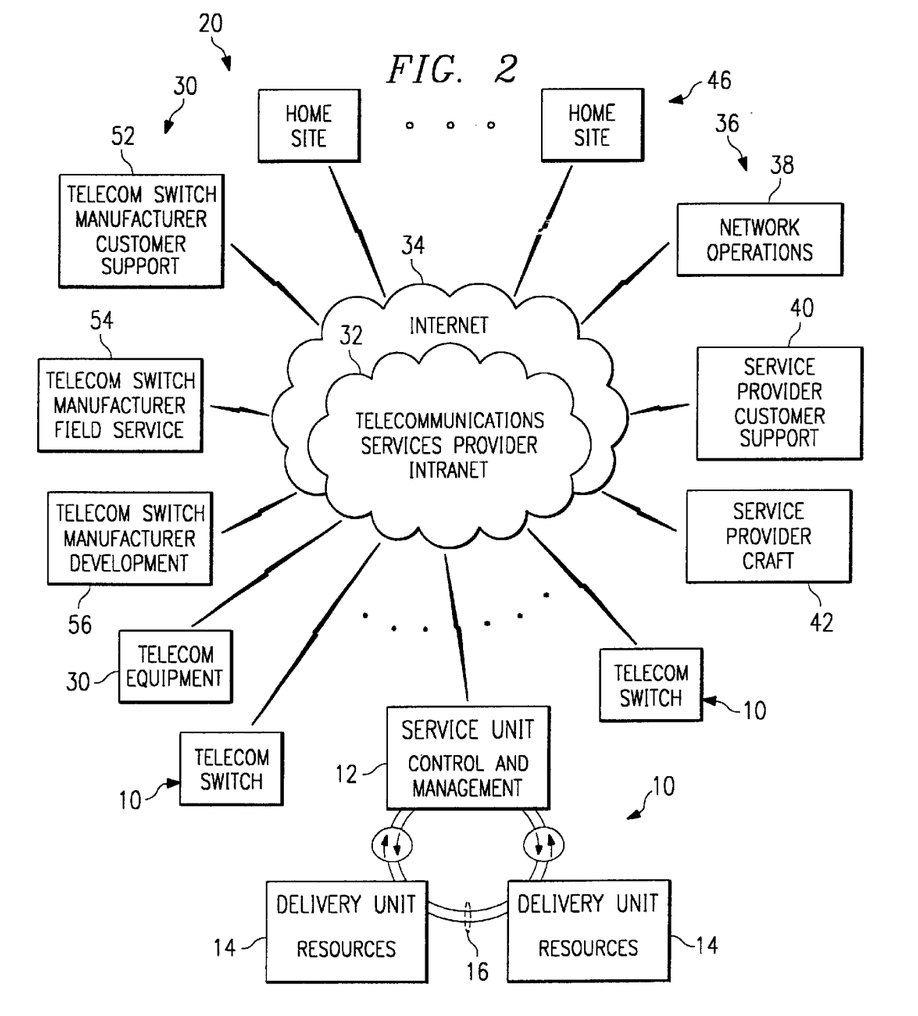
FIG. 2 is a high level block diagram of apparatus and method for monitoring and management of telecommunications equipment using enhanced internet access according to an embodiment of the present invention.

To provide maintenance and management of distributed telecommunications switching system 10 and other telecommunications equipment 30 in the telecommunications network, access thereto is provided through a telecommunications services provider's intranet 32 and the internet 34. Through internet 34 and intranet 32, telecommunications services provider's operations and support personnel 36 at various sites may access, monitor and control any of the telecommunications equipment. This may include personnel who operate out of home offices 46 or sites remote from a centralized network operations site 38, or customer support and craft sites 40 and 42. Further, personnel 50 of the telecommunications equipment manufacturer, such as customer support 52, field service 54, and development/engineering 56, may also access and provide maintenance and support of telecommunications equipment operating in the network through internet 34 and intranet 32.

Figure 3:
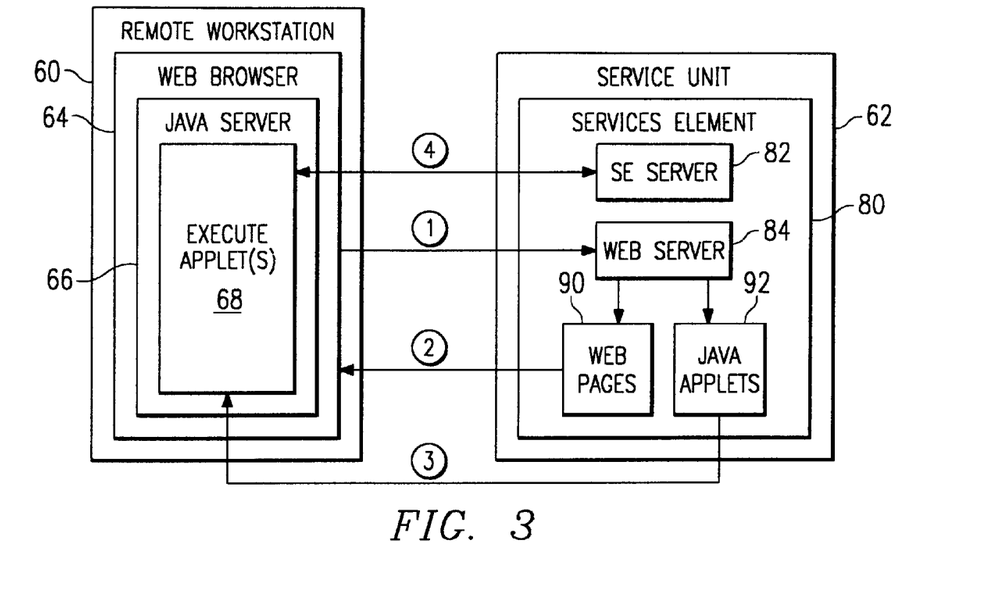
FIG. 3 is a more detailed block diagram of an exemplary communications process between a piece of telecommunications equipment and a remote workstation according to an embodiment of the present invention.

Referring to FIG. 3, a remote workstation 60 may communicate with a piece of telecommunications equipment such as service unit 62 via internet 34 and intranet 32 (FIG. 2). Remote workstation 60 may be a personal computer, lap top computer, notebook computer, workstation, and any other computing platform that is capable of executing a web browser program 64, preferably one that is Java-enabled, such as the Netscape Navigator™ and Microsoft Explorer™. When a web browser 64 is Java-enabled, it includes a Java server or engine 66 that enables it to execute Java applets or application programs 68.

Service unit 62 includes a services element (SE) 80 which is a process manager that controls and manages all the servers running in service unit 62, including a services element server 82 and a web server 84. Services Element 80 further includes web pages 90 in a specialized language, such as hyper-text markup language (HTML), and Java applets 92 that provide the context and application programs to monitor and control service unit 62.

In operation, workstation 60 dials up to an internet service provider with a modem (not shown) to obtain an internet connection. The craft personnel connects with web server 84 by supplying its web address or uniform resource locator (URL) to web browser 64. When a connection with web server 84 is made, a home web page may be displayed with access options. The craft personnel may specify a specific web page 90 by supplying its address or by clicking on an access option displayed on the home web page (action 1). Web server 84 looks up and sends the requested web page, which is transmitted then displayed on the screen of workstation 60 (action 2). Web server 84 further looks up and transmits one or more Java applets associated with the requested web page (action 3), which is then executed by Java server 66 on workstation 60. The executing Java applet may perform different functions, one of which is to a request specific data or information from services element server 82, such as trace log data for program trace information, information and problem reports (IPRs) for system status information, and automatic message accounting (AMA) status and information for billing purposes. Executing applets 68 may also allow a craft personnel to send command and control data to services element server 82, which may modify or update service unit operations.

Operating in this manner, authorized operations and support personnel of both the telecommunications services provider and equipment manufacturer may access and control the operations of all telecommunications-equipment in the network in a fast and efficient manner. This access method is platform independent and only requires the remote workstation to have a Java-enabled web browser to function. Accordingly, problems that surface in the middle of the night may be easily responded to by craft personnel working on home computers. The operations of remote equipment may also be easily maintained and managed. Further, the web pages along with the displayed data can be easily printed to obtain hard copy information of the telecommunications equipment.

It may be seen that network security issues must be addressed, and that security measures such as fire walls and the like may be used to ensure only personnel with the proper authorization may access in this manner.

Figure 4:
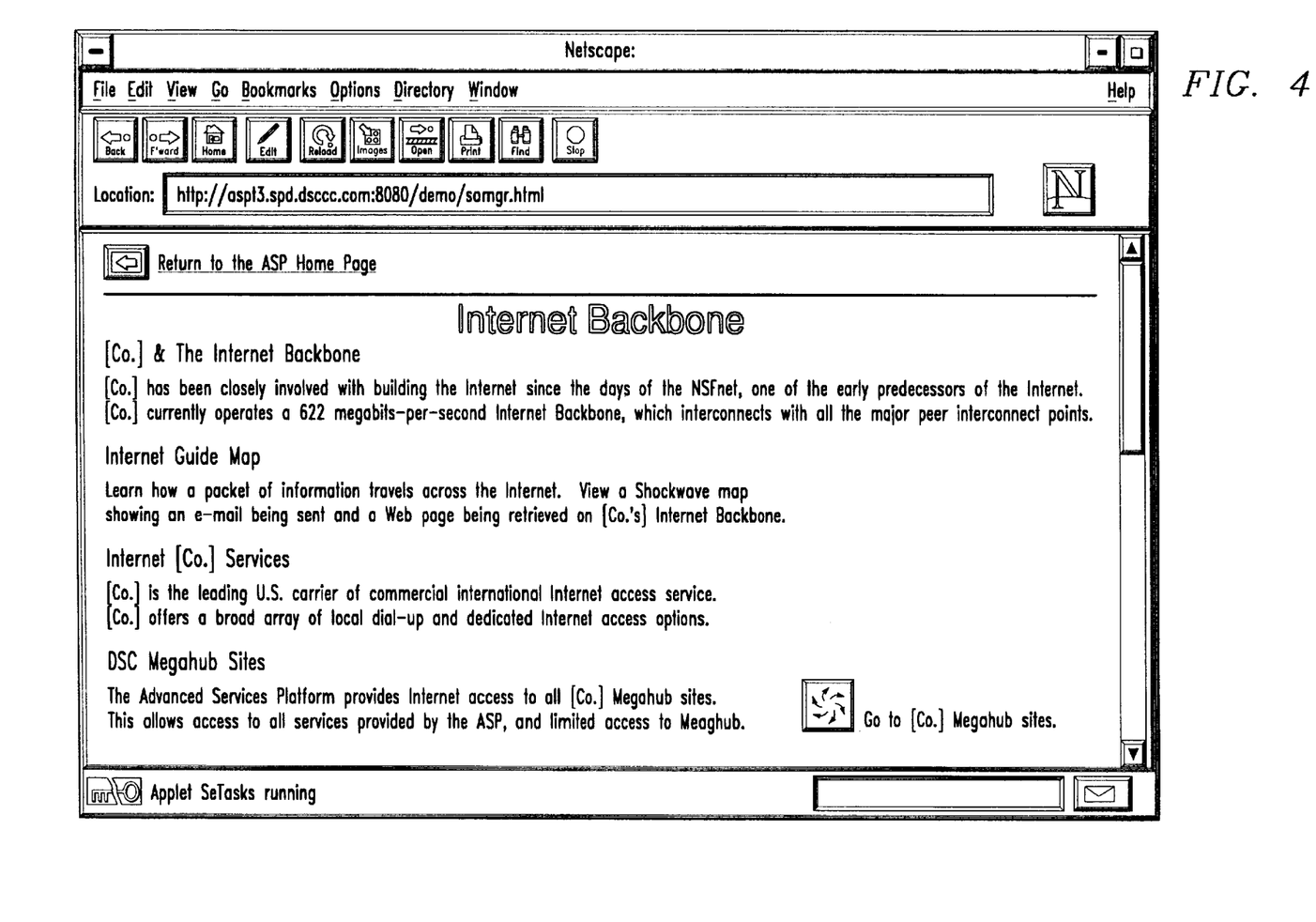
FIG. 4 is an exemplary screen of a web page serving as an entry point into remote access of telecommunications equipment via internet according to an embodiment of the present invention.
Figure 5:
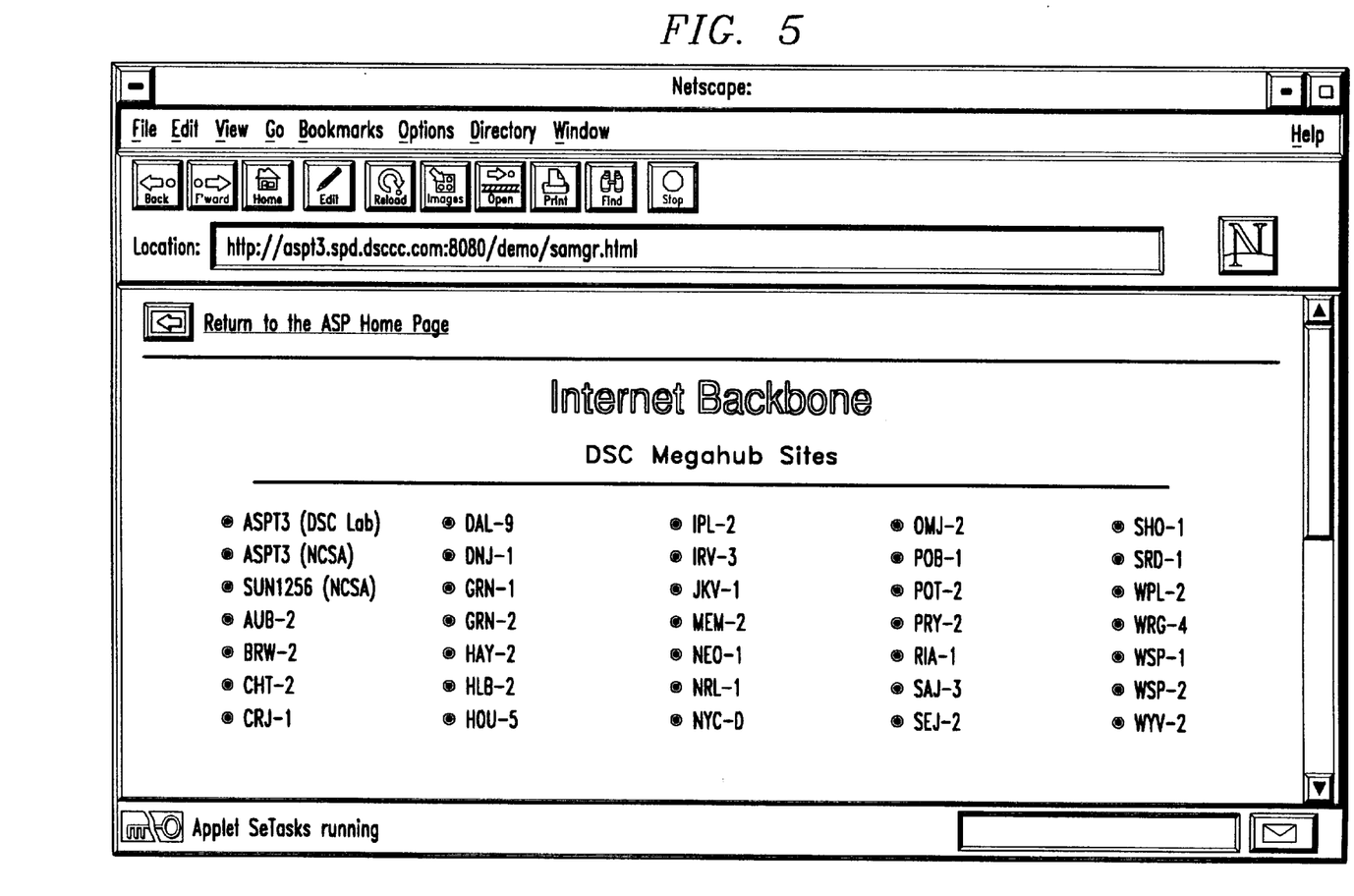
FIG. 5 is an exemplary screen of a web page providing a selection list of telecommunications equipment available for access via internet according to an embodiment of the present invention.
Figure 6:
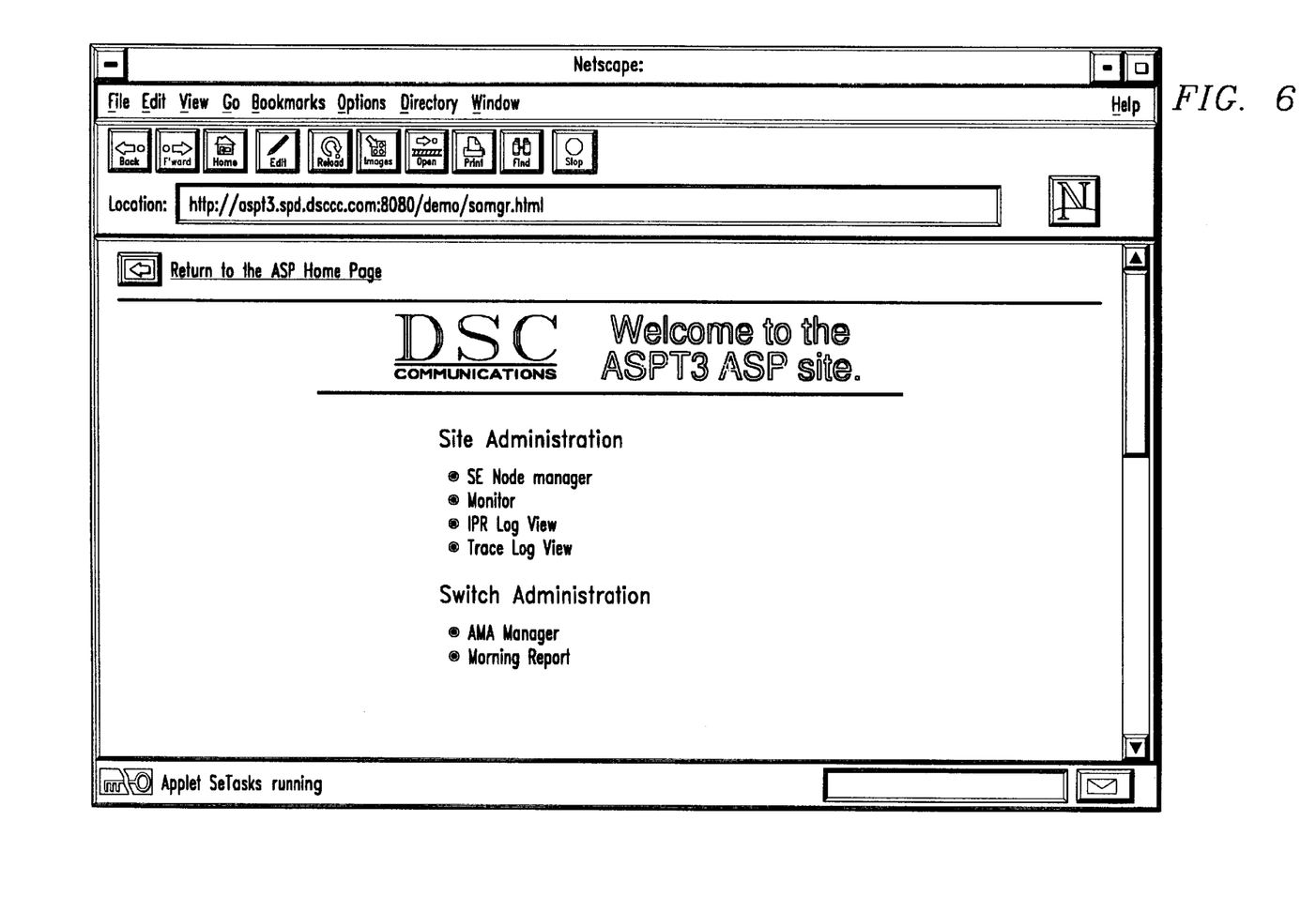
FIG. 6 is an exemplary screen of a web page providing a selection of available monitoring and management functionality for access via internet according to an embodiment of the present invention.

FIG. 4 is an exemplary home page that provides access to telecommunications equipment in the network. The text "DSC Megahub™ Sites" may be highlighted to show that it is a hyper link to another web page, which is shown in FIG. 5. FIG. 5 provides a list of hyper links to a number of telecommunications equipment, more specifically, telecommunications switches, that are in the network and available for access. The craft personnel may select a specific equipment by clicking on its name, which brings up a subsequent web page, shown in FIG. 6. FIG. 6 provides an exemplary list of functionality available for the selected equipment, which includes functionality related to a site or service unit, or functionality related to a delivery unit of the site.

Figure 7:
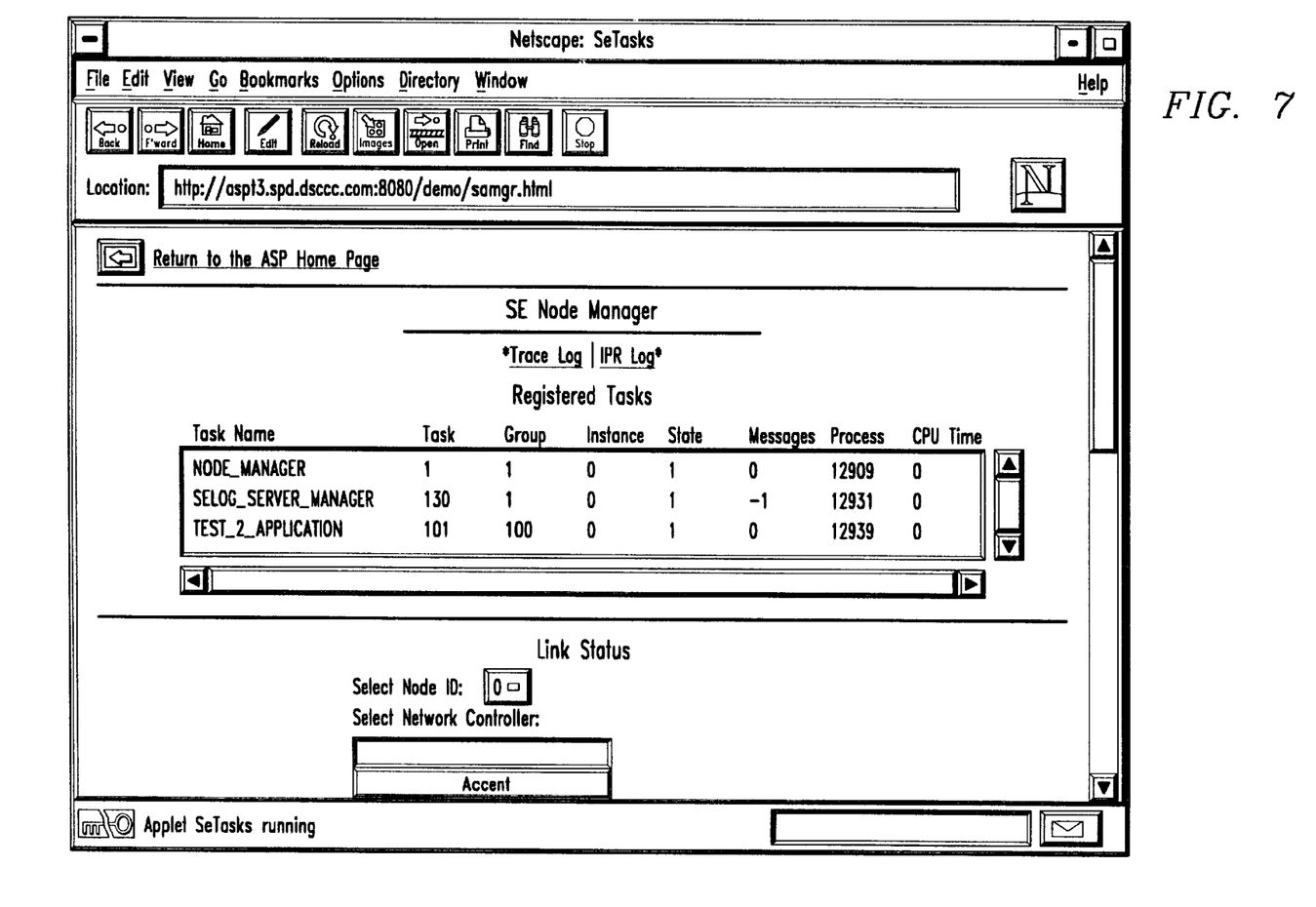
FIG. 7 is an exemplary screen of a web page executing one or more java applets and displaying a list of registered tasks or applications via internet according to the teachings of the present invention.

FIG. 7 is an exemplary screen representation of the services element node manager or services element web page, when it is selected. A list of tasks or processes registered with services element is displayed along with attendant information. Where more than one equipment is resident at the same site, the craft personnel may supply a node identifier (ID) and local area network (LAN) controllers to enable the monitoring and management of specific local area network (LAN) segments and communications thereon.

Figure 8:
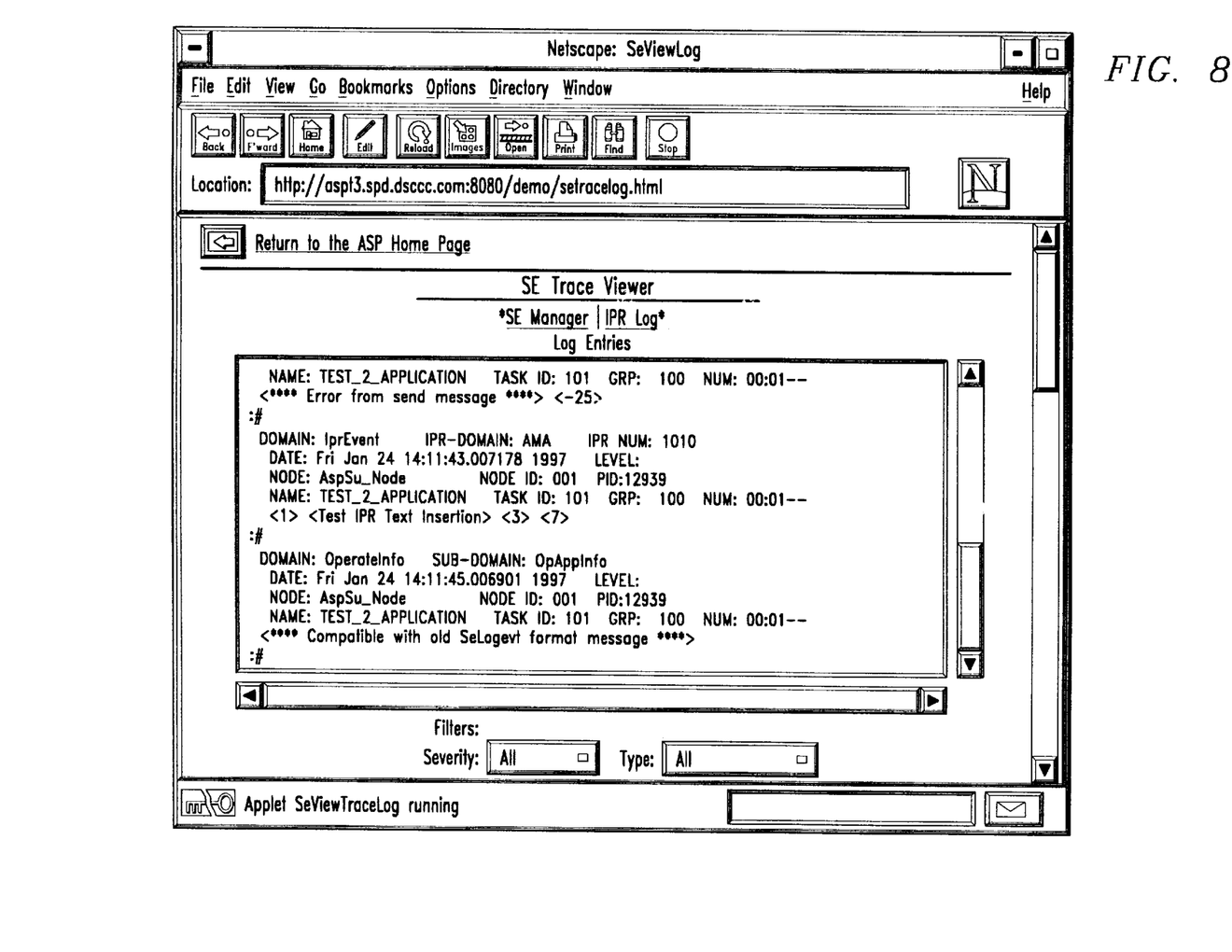
FIG. 8 is an exemplary screen of a web page executing one or more java applets and displaying a trace log via internet according to an embodiment of the present invention.

FIG. 8 is an exemplary screen representation of a web page providing trace message information. Trace logs may be used to gather data during network and equipment troubleshooting sessions, for example. Filters are available to provide several levels or views of trace messages. As it may be seen, the trace function may focus on one or more domains or sub-domains.

Figure 9:
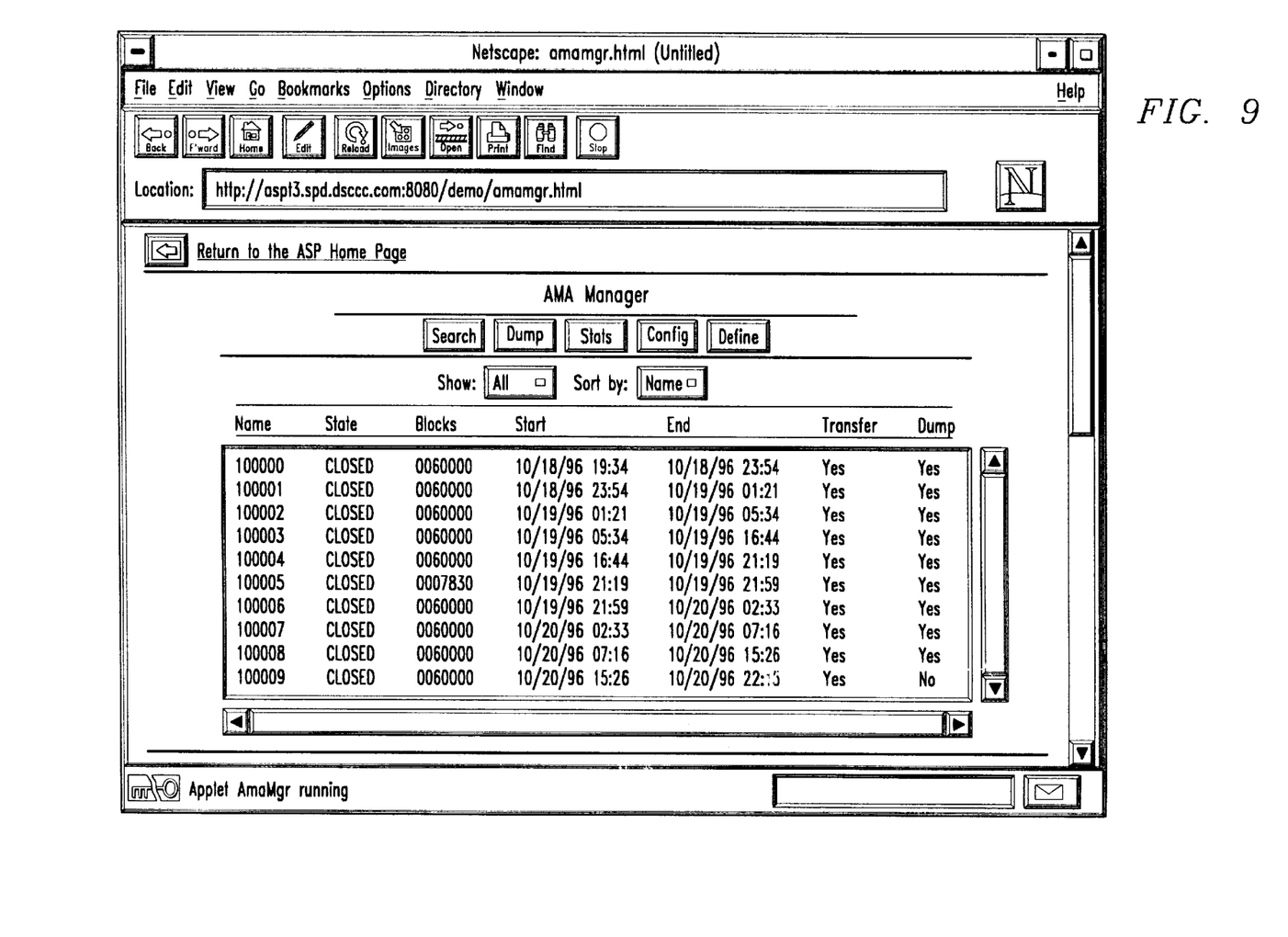
FIG. 9 is an exemplary screen of a web page executing one or more java applets and displaying the status of an automatic message accounting server via internet according to an embodiment of the present invention.

Automated message accounting is the function of dumping or transferring call records to tape. FIG. 9 provides an exemplary screen representation of a web page that provides automatic message accounting monitoring and management. From this web page, a craft personnel may search for a specific block of call records, and manually dump it to tape, for example.

Figure 10:
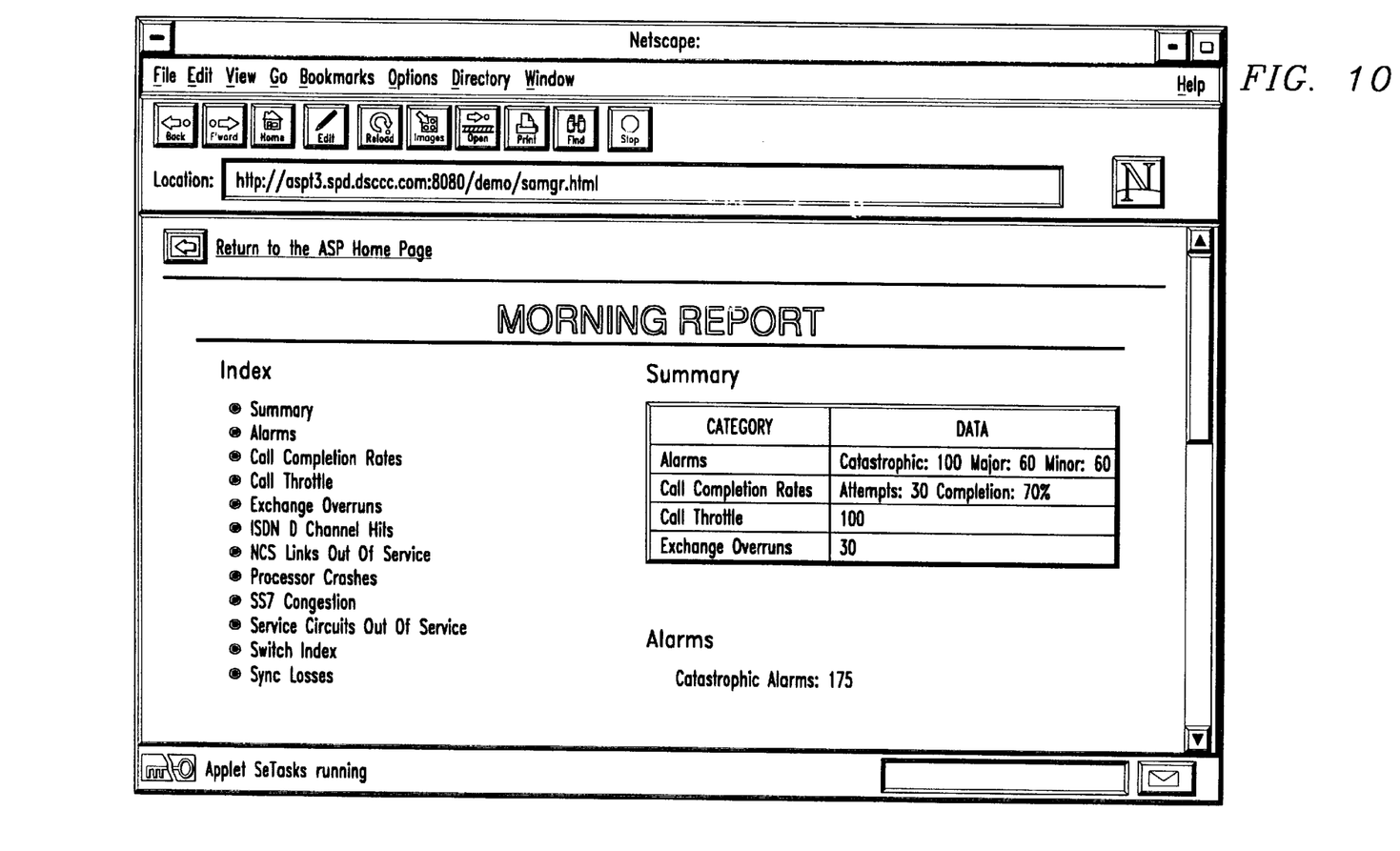
FIG. 10 is a portion of an exemplary screen of a web page executing one or more java applets and displaying a morning report via internet according to an embodiment of the present invention.

FIG. 10 is an exemplary web page of a morning report, also available through internet access according to the teachings of the present invention. Every morning or any other selected time of the day or night, certain specific information about each equipment or site may be collected and reported by Java applets of this web page. An exemplary list of information is shown in FIG. 10.

Figure 11:
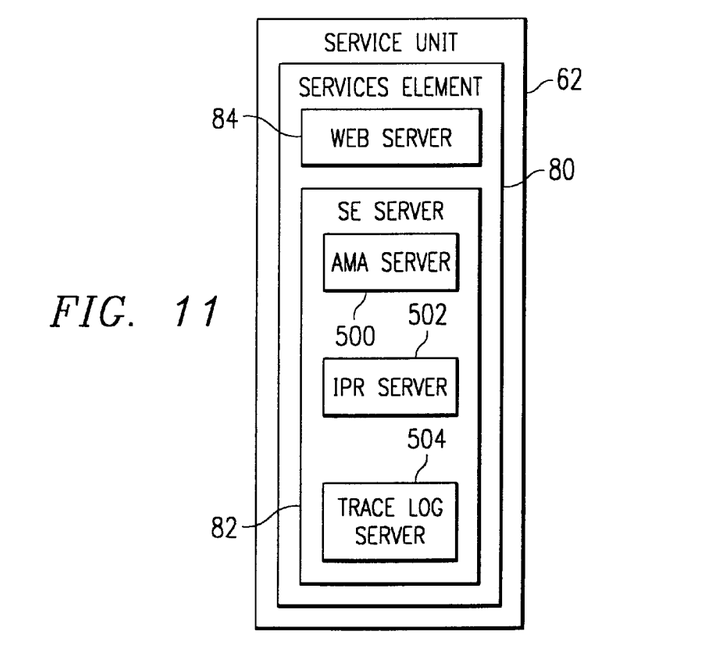
FIG. 11 is a block diagram of exemplary server processes running in the services element according to an embodiment of the present invention.

Referring to FIG. 11, it may been that in addition to services element server 82 and web server 84 described above, there may be further provided an automatic message accounting server 500, an information and problem report server 502, and a trace log server 504 that perform the respective functions and provide web server 84 the attendant information displayed by each web page. For a more detailed discussion of automatic message accounting server 500, please refer to U.S. patent application Ser. No. 08/757,465, titled Database-Driven Automatic Message Accounting System and Method (Attorney Docket 036560.1565), incorporated herein by reference.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for monitoring and management of telecommunications equipment using the internet, comprising:
   a web server residing on the telecommunications equipment, the telecommunications equipment being identifiable by an internet address via its web server;
   a plurality of web pages adapted to display monitor information associated with the telecommunications equipment and receive user input, the web pages being accessible by the web server and each web page being identifiable by an internet address; and
   a web browser application executing on a user device adapted to directly connect with the telecommunications equipment using its internet address and to further receive the plurality of web pages therefrom over the internet, and to receive the user input and transmit the user input to the web server, wherein the web server is operable to modify or update operations of telecommunications equipment in response to the user input.

2. The system, as set forth in claim 1, further comprising an automatic message accounting server accessible by the web browser and having a plurality of web pages dedicated to billing information monitoring and management.

3. The system, as set forth in claim 1, further comprising an information and problem report server accessible by the web browser and having a plurality of web pages dedicated to system status information monitoring and management.

4. The system, as set forth in claim 1, further comprising a trace log server accessible by the web browser and having a plurality of web pages dedicated to program trace information monitoring and management.

5. The system, as set forth in claim 1, further comprising java applets associated with the plurality of web pages, the java applets being downloadable to the user device and executed by the web browser.

6. The system, as set forth in claim 1, wherein the telecommunications equipment is a distributed switching system having a service unit coupled to at least one delivery unit, the web server residing in the service unit.

7. The system, as set forth in claim 1, further comprising an intranet coupling the user device to the web server residing on the telecommunications equipment.

8. The system, as set forth in claim 1, further comprising an automatic message accounting server in communications with the web server and having a plurality of web pages dedicated to billing information monitoring and management.

9. The system, as set forth in claim 1, further comprising an information and problem report server in communications with the web server and having a plurality of web pages dedicated to system status information monitoring and management.

10. The system, as set forth in claim 1, further comprising a trace log server in communications with the web server and having a plurality of web pages dedicated to program trace information monitoring and management.

11. A system for monitoring and management of telecommunications equipment in a telecommunications network via the internet, comprising:
   a plurality of user devices each executing a web browser for communications with the internet;
   an intranet in communications with the internet;
   a web server residing on each telecommunications equipment, each telecommunications equipment being accessed by an internet address via its associated web server, the telecommunications equipment of the telecommunications network being accessible by the intranet; and
   a plurality of web pages adapted to display monitor information associated with the telecommunications equipment and receive user input, the web pages being accessible by the web server and each web page being identifiable by an internet address, each user device operable to directly connect with a particular telecommunications equipment using its internet address in order to access its associated web pages, the web server operable to modify operations of its associated telecommunications equipment in response to the user input.

12. The system, as set forth in claim 11, further comprising an automatic message accounting server accessible by the web browser and having a plurality of web pages dedicated to billing information monitoring and management.

13. The system, as set forth in claim 11, further comprising an information and problem report server accessible by the web browser and having a plurality of web pages dedicated to system status information monitoring and management.

14. The system, as set forth in claim 11, further comprising a trace log server accessible by the web browser and having a plurality of web pages dedicated to program trace information monitoring and management.

15. The system, as set forth in claim 11, further comprising java applets associated with the plurality of web pages, the java applets being downloadable to the user device and executed by the web browser.

16. The system, as set forth in claim 11, wherein the telecommunications equipment is a distributed switching system having a service unit coupled to at least one delivery unit, the web server residing in the service unit.

17. The system, as set forth in claim 11, wherein the plurality of web pages include web pages dedicated to automatic message accounting information for billing information monitoring and management.

18. The system, as set forth in claim 11, wherein the plurality of web pages include web pages dedicated to information and problem report information for system status information monitoring and management.

19. The system, as set forth in claim 11, wherein the plurality of web pages include web pages dedicated to program trace information monitoring and management.

20. A method for monitoring and management of telecommunications equipment in a telecommunications network via the internet, comprising the steps of:

connecting a plurality of user devices to the internet, each user device executing a web browser;

connecting the telecommunications equipment by an intranet to the internet;

accessing a telecommunications equipment by specifying an internet address associated therewith through a web server residing on the telecommunications equipment;

downloading a plurality of web pages from the web server to at least one user device via the internet and intranet, the web pages being adapted to display monitor and management information associated with the telecommunications equipment, each user device operable to directly connect with a particular telecommunications equipment using its internet address in order to access its associated web pages;

receiving user input at the web server from the at least one user device; and modifying operations of telecommunications equipment associated with the web server in response to the user input.

21. The method, as set forth in claim 20, further comprising the steps of:

accessing an automatic message accounting server; and downloading a plurality of web pages dedicated to billing information monitoring and management.

22. The method, as set forth in claim 20, further comprising the steps of:

accessing an information and problem report server; and downloading a plurality of web pages dedicated to system status information monitoring and management.

23. The method, as set forth in claim 20, further comprising the steps of:

accessing a trace log server; and downloading a plurality of web pages dedicated to program trace information monitoring and management.

24. The method, as set forth in claim 20, further comprising the step of executing java applets associated with the plurality of web pages, the java applets being downloadable to the user device and executed by the web browser.

25. The method, as set forth in claim 20, wherein the downloading step further comprises the step of downloading a plurality of web pages dedicated to automatic message accounting information monitoring and management.

26. The method, as set forth in claim 20, wherein the downloading step further comprises the step of downloading a plurality of web pages dedicated to system status information monitoring and management.

27. The method, as set forth in claim 20, wherein the downloading step further comprises the step of downloading a plurality of web pages dedicated to program trace information monitoring and management.

* * * * *